(12) United States Patent
Kim et al.

(10) Patent No.: US 7,120,848 B2
(45) Date of Patent: Oct. 10, 2006

(54) APPARATUS AND METHOD FOR FORWARD ERROR CORRECTION

(75) Inventors: Yong-Deok Kim, Seoul (KR); Yun-Je Oh, Yongin-shi (KR); Jun-Ho Koh, Suwon-shi (KR); Han-Lim Lee, Seoul (KR); Byung-Jik Kim, Songnam-shi (KR); Chan-Youl Kim, Puchon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 501 days.

(21) Appl. No.: 10/358,535

(22) Filed: Feb. 5, 2003

(65) Prior Publication Data

US 2003/0159104 A1    Aug. 21, 2003

(30) Foreign Application Priority Data

Feb. 16, 2002    (KR) ................. 2002-8333

(51) Int. Cl.
 *H03M 13/00*    (2006.01)
(52) U.S. Cl. ................. 714/752; 714/786
(58) Field of Classification Search ........... 714/752, 714/746, 786
See application file for complete search history.

(56) References Cited

U.S. PATENT DOCUMENTS

| | | | |
|---|---|---|---|
| 4,121,195 A * | 10/1978 | Jessop | 375/211 |
| 4,887,280 A | 12/1989 | Reisenfeld | 375/377 |
| 5,978,428 A | 11/1999 | Hayashi | 375/377 |

FOREIGN PATENT DOCUMENTS

| | | |
|---|---|---|
| EP | 0944212 | 9/1999 |
| JP | 2001-053814 | 2/2001 |
| WO | WO01/05067 | 1/2001 |

OTHER PUBLICATIONS

Tan et al., A 70Mb/s Variable-rate 1024QAM cable receiver IC with integrated 10b ADC and FEC decoder, Feb. 6, 1998, ISSCC digest of technical papers, google.com, p. 200-202, retrived Aug. 24, 2005.*

Pierobon st al., performances of an analog error monitor with parity check codes, Mar. 1980, electronic systems for remote sensing and ranging: international sicentific congress on electronics, p. 285-290.*

* cited by examiner

*Primary Examiner*—Shelly Chase
(74) *Attorney, Agent, or Firm*—Cha & Reiter, LLC

(57) ABSTRACT

The provided forward error correction (FEC) apparatus for a transmission system includes a low pass filter (LPF) passing only a low frequency component of an input signal having a predetermined transmission rate; an AC power meter converting an energy value of an signal output from the LPF into a DC voltage value; a logarithm amplifier converting the exponentially varying DC voltage value from the AC power meter into a linear logarithmically varying DC voltage value; a digital signal processor (DSP) determining the transmission rate of the input signal according to a magnitude of the linear DC voltage value and outputting a control signal according to the transmission rate; a clock generator receiving the control signal and generating a clock signal according to the control signal; and a FEC module receiving the clock signal and performing FEC operation on the received signal. A method for FEC is also provided.

4 Claims, 5 Drawing Sheets

APPARATUS AND METHOD FOR FORWARD ERROR CORRECTION

CLAIM OF PRIORITY

This application claims priority to an application entitled "APPARATUS AND METHOD FOR FORWARD ERROR CORRECTION", filed in the Korean Intellectual Property Office on Feb. 16, 2002 and assigned Serial No. 2002-8333, the contents of which are hereby incorporated by reference.

BACKGROUND OF THE INVENTION

1. Field of the Invention

The present invention relates to an apparatus and method for forward error correction (FEC), and more particularly to an apparatus and method for forward error correction that occurs in a variable code length.

2. Description of the Related Art

Due to current trend of rapidly growing multimedia demands, the need for a mass storage transmission system is increasing fast. A major role of the mass storage transmission system is performing a FEC (Forward Error Correction) operation, which includes detecting and correcting an error generated during the signal transmission back to an original state. Currently, numerous types of FEC devices have been introduced in the form of a chip. In most conventional FEC devices, the length of overhead added on a payload may be variable in response to an adapted algorithm, so that a line rate (i.e., transmission rate) for carrying out an error correction can be also varied in response to the adapted algorithm. As such, it is impossible to establish a mutual signal exchange protocol between optical networks using the conventional FEC chips.

FIG. 1 is a simplified block diagram illustrating a conventional FEC system used in processing a fixed transmission rate. As shown in FIG. 1, the conventional FEC system comprises a pre-amplifier PIN/PreAmp 100, an amplifier (Limiting Amplifier) 110, a FEC (Forward Error Correction) module 120, an EAM-LD 130, a controller 140, and a clock generator (Clock Box) 150. In operation, the pre-amplifier PIN/PreAmp 100 and the amplifier (Limiting Amplifier) 110 amplify input signals to a predetermined signal level, respectively. Then, the FEC module 120 performs a FEC operation on the input signals according to the control signals of the clock generator (Clock Box) 150 and the controller 140. The controller 140 controls the overall operation of the clock generator (Clock Box) 150 and the FEC module 120. The output signal of the FEC module 120 is an error-corrected signal, and the EAM-LD 130 converts the output signal of the FEC module 120 to an optical signal.

The output signals transmitted from the system of FIG. 1 are typically transmitted/received at a predetermined transmission rate. To achieve this, the controller 140 presets the predetermined transmission rate in the clock generator (Clock Box) 150, and the clock generator (Clock Box) 150 generates clock signals corresponding to the predetermined transmission rate. However, as the conventional FEC systems are only operable at a predetermined transmission rate, they cannot recognize a data frame coming at a different transmission rate. According, they must be manually adjusted to the different transmission rate to establish synchronization each time.

SUMMARY OF THE INVENTION

The present invention overcomes the above-described problems, and provides additional advantages, by providing an apparatus and method for forward error correction (FEC) on signals having different transmission rates.

In accordance with the present invention, a forward error correction (FEC) apparatus used in a transmission system includes: a low pass filter (LPF) for passing only a low frequency component of a signal upon receiving input signals having a predetermined transmission rate; an AC power meter for converting the energy value of an output signal of the LPF into a DC voltage value; a logarithm amplifier for receiving the DC voltage value from the AC power meter, for converting the DC voltage value being exponentially variable into a linear DC voltage value being logarithmically variable, and for outputting the linear DC voltage value to a digital signal processor (DSP); a digital signal processor (DSP) for determining the transmission rate of the received signal according to a magnitude of the DC voltage value and outputting a control signal for generating a clock signal in response to the determined transmission rate to a clock generator; a clock generator for generating a clock signal in response to the control signal and outputting the clock signal to a forward error correction (FEC) module; and, a forward error correction (FEC) module for receiving the clock signal from the clock generator and for performing a FEC operation on the received signal.

It is another aspect of the present invention to provide an apparatus and method for automatically sensing transmission rates of the received signals, then performing a FEC operation on each received signal.

Still another aspect is that the present invention may be realized in a simple, reliable, and inexpensive implementation.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF THE PREFERRED EMBODIMENTS

Figure 1:
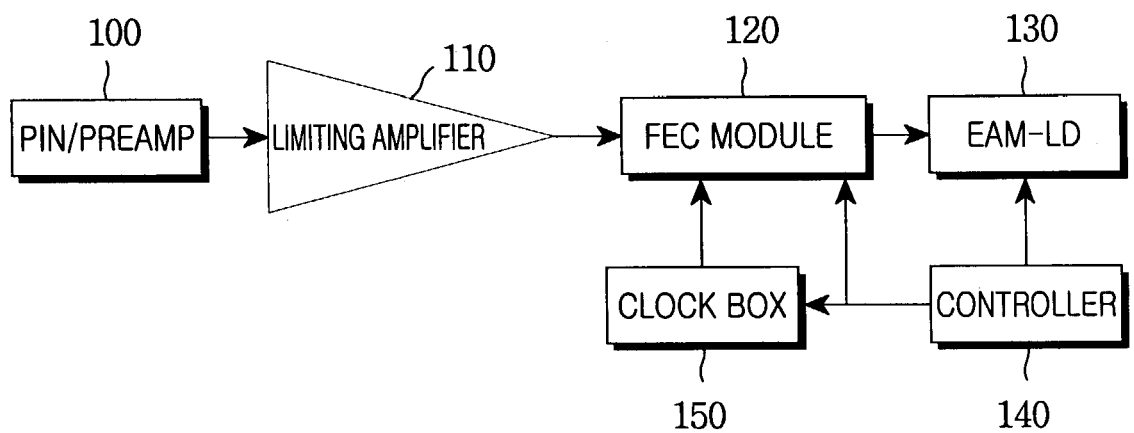
FIG. 1 illustrates a block diagram of a conventional FEC system used for processing only a fixed transmission rate.

Now, preferred embodiments of the present invention will be described in detail with reference to the annexed drawings. In the drawings, the same or similar elements are denoted by the same reference numerals even though they are depicted in different drawings. For simplicity and clarity, a detailed description of known functions and configurations incorporated herein will be omitted as it may make the subject matter of the present invention rather unclear.

According to the teachings of the present invention, the inventive system automatically senses the transmission rates of signals having different FEC transmission rates and then performs a FEC function irrespective of a transmission rate. For this end, the present invention proposes a FEC system implemented with an automatic line-rate detection circuit and a digital signal processing circuit, and a method for controlling the FEC system. Further, the present invention uses the energy characteristics of signals to embody a FEC system configured to operate with the variable transmission rates. The use of the energy characteristics of signals allows the transmission rates of the signals to increase in inverse proportion to the energy quantity of the filtered signals. In particular, the energy quantity of the signals is calculated and the transmission rates of the signals according to the calculated energy quantity are determined, then finally determines each transmission rate at which the FEC system must operate is determined based on the calculated transmission rates. As such, the inventive FEC system is capable of processing any input signals with different transmission rates.

Now, a description will be made in detail in regards to this invention with reference to the drawings.

Figure 2:
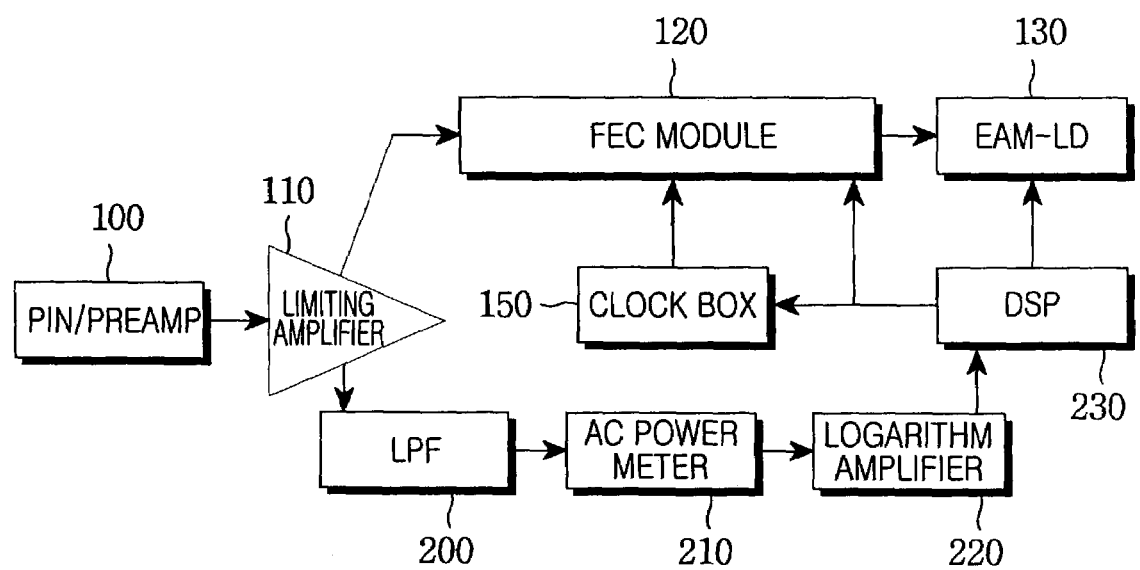
FIG. 2 illustrates a block diagram of a FEC system in accordance with a preferred embodiment of the present invention.

FIG. 2 illustrates a block diagram of a FEC system for processing a variable code length in accordance with a preferred embodiment of the present invention. As shown in FIG. 2, a FEC system according to the present invention includes a pre-amplifier PIN/PreAmp 100, an amplifier (Limiting Amplifier) 110, a LPF (Low Pass Filter) 200, an AC power meter 210, a logarithm amplifier 220, a DSP (Digital Signal Processor) 230, a clock generator (Clock Box) 150, and a FEC (Forward Error Correction) module 120. In operation, the pre-amplifier PIN/PreAmp 100 amplifies a signal received over the network, and the amplifier (Limiting Amplifier) 110 amplifies the signal received from the pre-amplifier PIN/PreAmp 100. The LPF 200 cuts off a high frequency component of the signal received from the amplifier 110, but passes a low frequency component of the signal. The AC power meter 210 converts the energy value of a signal being low-pass-filtered by the LPF 200 into a DC voltage value. The logarithm amplifier 220 converts a DC voltage value being exponentially variable into a linear DC voltage value being logarithmically variable. In particular, the logarithm amplifier 220 amplifies an input signal having a large difference between the amplification degrees without causing a signal saturation, allows the relationship between an input signal and an output signal to follow a logarithmic relation (i.e., algebraic function), and reduces the distortion of the output signal (i.e., output waveform). Accordingly, as the FEC system has output signals of reduced distortion, it can obtain more stable output signals by means of the logarithm amplifier 220.

The DSP 230 receives the output signals of the logarithm amplifier 220, recognizes the difference between the transmission rates of the output signals as a DC voltage value, then outputs a control signal for generating a clock signal corresponding to the recognized transmission rate to the clock generator (Clock Box) 150. Note that the DSP 230 also performs the same function as a conventional controller 140 shown in FIG. 1. The clock generator 150 generates a corresponding clock signal according to the control signal received from the DSP 230 and outputs it to the FEC module 120. The FEC module 120 performs a FEC operation on the signal received from the amplifier 110 using the clock signal from the clock block 150. Finally, the EAM-LD 130 converts the signal corrected by the FEC module 120 to an optical signal.

Figure 3:
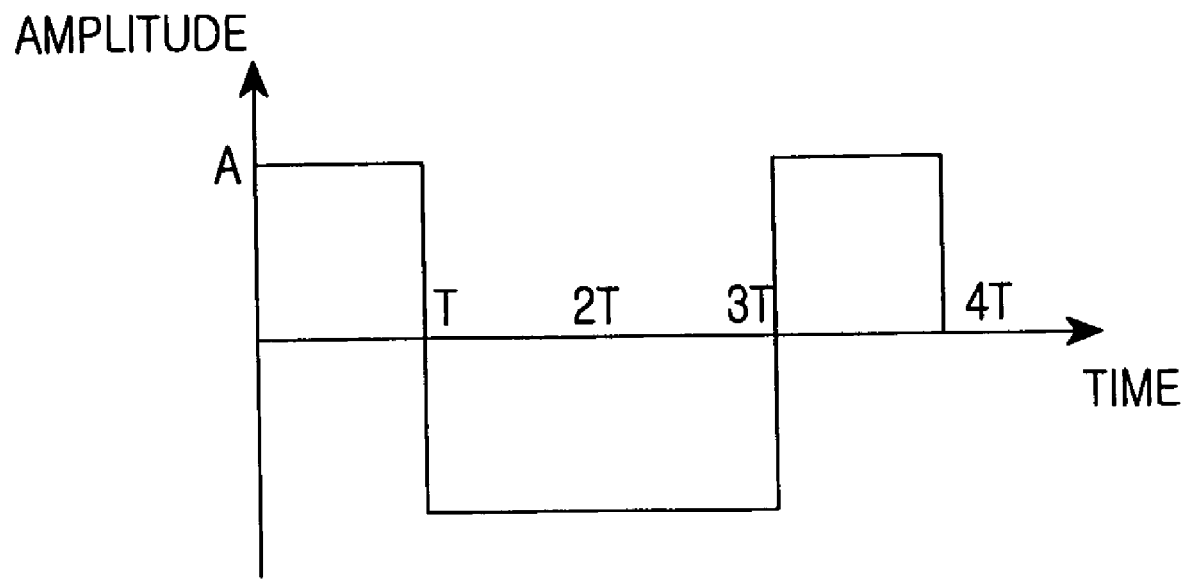
FIG. 3 illustrates a NRZ (Non Return to Zero) format signal in accordance with a preferred embodiment of the present invention.
Figure 4:
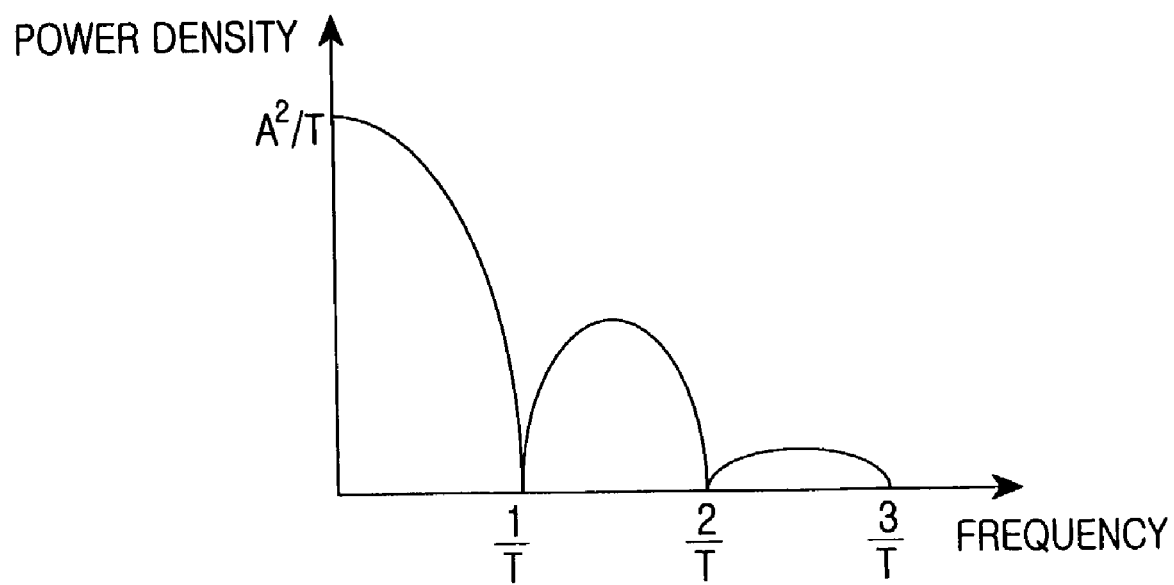
FIG. 4 illustrates the relationship between the frequency and the power density in accordance with a preferred embodiment of the present invention; and, FIG. 5 illustrates the power spectrum distribution of a signal after passing a LPF (Low Pass Filter) in accordance with a preferred embodiment of the present invention.

Note that the signal received at the pre-amplifier 100 of FIG. 2 is a baseband signal that a NRZ (Non Return to Zero) format that is modulated using an OOK (On-Off Keying) method. As such, the signal received at the pre-amplifier 100 is converted to a NRZ signal at the optical receiver of the pre-amplifier 100, and then the NRZ signal waveform is reshaped as shown in FIG. 3. FIG. 3 is illustrates a signal format in a time domain in accordance with a preferred embodiment of the present invention, and in particular the NRZ format signal in a time domain. The signal reshaped as shown in FIG. 3 is amplified by the amplifier 110 and then transmitted to the FEC module 120 and the LPF 200. Note that the amplifier 110 can be implemented using a limiting amplifier. Note that the power density of the signal reshaped as shown in FIG. 3 can be represented, as shown in FIG. 4. Note that the total power in a time domain of a predetermined signal is identical with that in a frequency domain of the predetermined signal in compliance with the Parseval theorem. Therefore, the time domain signal can be changed to the frequency domain signal, if necessary.

Figure 5:
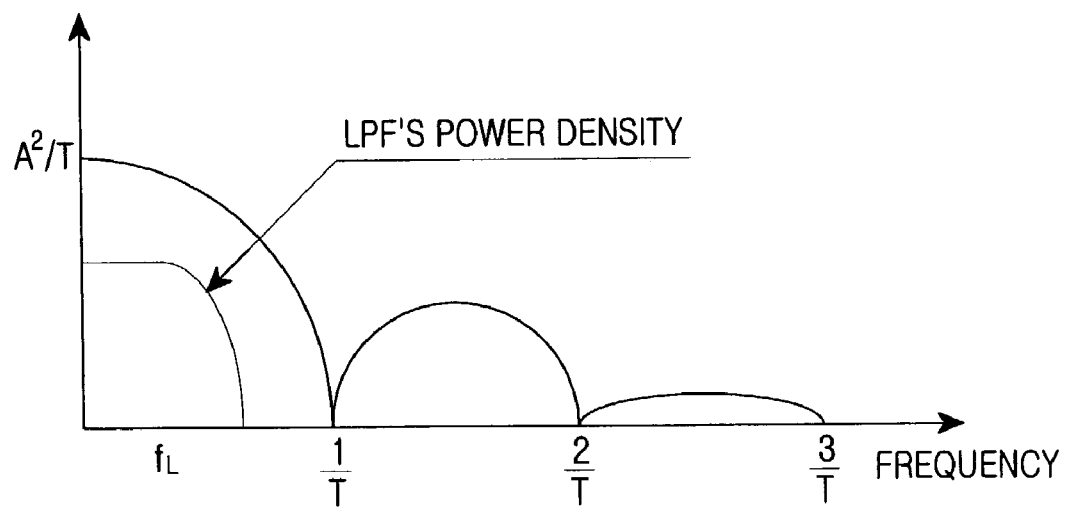

FIG. 4 shows a signal format in a frequency domain and illustrates the relationship between the signal frequency and the signal power density in accordance with a preferred embodiment of the present invention. If the time domain signal of FIG. 3 is converted to a frequency domain signal, then the signal format shown in FIG. 4 is provided. That is, the signal shown in FIG. 3 is the same as the signal shown in FIG. 4. Conversion from the FIG. 3 to the FIG. 4 is accomplished using a Fourier Transform operation. The signal in FIG. 4 is generated from the amplifier 110 and transmitted to the LPF 200. If the signal passes the LPF 200, namely, if the signal is convolution-processed on a time axis, then the signal passing the LPF 200 in compliance with the convolution theory is represented as the product of the LPF 200 and the signal itself, as shown in FIG. 5. In the embodiment, an 8-order butterworth filter may be used as the LPF 200, but it should be noted that other various LPFs known to those skilled in this art can be used. Also, the present invention facilitates the control of the LPF 200 by using a low frequency signal being low-pass-filtered. At the same time, the present invention can minimize the influence of the white noises by adjusting the cutoff frequency of the LPF 200. The requirements of signal characteristics using the LPF are well know that such a description of the requirements will be omitted hereinafter for simplicity.

FIG. 5 depicts the power spectrum distribution of a signal after passing a LPF (Low Pass Filter) in accordance with a preferred embodiment of the present invention.

As shown in FIG. 5, the reference character "$f_L$" represents a cutoff frequency of a LPF 200. Generally, when a frequency (i.e., a transmission rate) of a signal is lowered, the energy of the signal is concentrated on a lower frequency domain, such that the transmission rate of a predetermined signal is inversely proportional to the energy level of the signal low-pass-filtered by the LPF 200. As such, calculating the energy value of the low-pass-filtered signal allows the transmission rate of the low-pass-filtered signal to be calculated. For example, the low-pass-filtered signal is inputted to the AC power meter 210. The energy value of the signal is converted to an AC voltage in the AC power meter 210. The logarithm amplifier 220 changes the AC voltage being exponentially variable to a linear AC voltage. The output signal of the logarithm amplifier 220 is inputted to the DSP 230. The DSP 230 recognizes the difference between the transmission rates of the signals on the basis of the magnitude (i.e., amplitude) of the AC voltages. The DSP 230 outputs a control signal for generating a clock signal corresponding to the recognized transmission rate to the clock generator 150. The clock generator 150, upon receiving the control signal, generates a clock signal indicated by the control signal and then outputs the indicated clock signal to the FEC module 120. Accordingly, the clock signal generated from the clock generator 150, upon receiving the control signal from the DSP 230, is identical with the transmission rate of a signal received at the FEC module 120 from the amplifier 110. Therefore, the FEC module 120 can recognize the data frame of a signal received from the amplifier 110 by adopting the clock signal, while correcting an error generated during the transmission step. As a result, the FEC module 120 can perform a FEC operation on the received signals irrespective of the transmission rates of the received signals.

As apparent from the above description, the present invention makes it possible to interconnect between networks using FEC circuits having different transmission rates. Also, the present invention is controlled easily by controlling the low frequency signal, thus minimizing the influence of the white noises. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A forward error correction (FEC) apparatus used in a transmission system, comprising:
    a low pass filter (LPF) for passing a low frequency component of an input signal having a predetermined transmission rate;
    an AC power meter for converting an energy value of an output signal of the LPF into a DC voltage value;
    a logarithm amplifier for receiving the DC voltage value from the AC power meter, for converting the DC voltage value into a linear DC voltage value, and for outputting the linear DC voltage value to a digital signal processor (DSP);
    a digital signal processor (DSP) for determining a transmission rate of the input signal according to a magnitude of the DC voltage value and for outputting a control signal for generating a clock signal in response to the determined transmission rate to a clock generator;
    a clock generator for generating a clock signal in response to the control signal from the DSP and for outputting the clock signal to a forward error correction (FEC) module; and,
    a forward error correction (FEC) module for performing a FEC operation on the input signal based on the clock signal from the clock generator.

2. The FEC apparatus as set forth in claim 1, wherein the LPF is a butterworth filter.

3. The FEC apparatus as set forth in claim 1, further comprising a converter for converting the output of the FEC module to an optical signal.

4. A method for performing a forward error correction (FEC), the method comprising the steps of:
    low-pass-filtering an input signal;
    measuring a voltage value of the low-pass-filtered signal;
    determining a transmission rate of the input signal in response to the measured voltage value;
    generating a clock signal in response to the determined transmission rate; and,
    performing a FEC operation on the input signal according to the clock signal.

* * * * *